March 1, 1966 N. T. GENERAL ET AL 3,237,482
MULTIPLE SPEED RATIO POWER TRANSMISSION MECHANISM
Filed Feb. 4, 1963 2 Sheets-Sheet 2
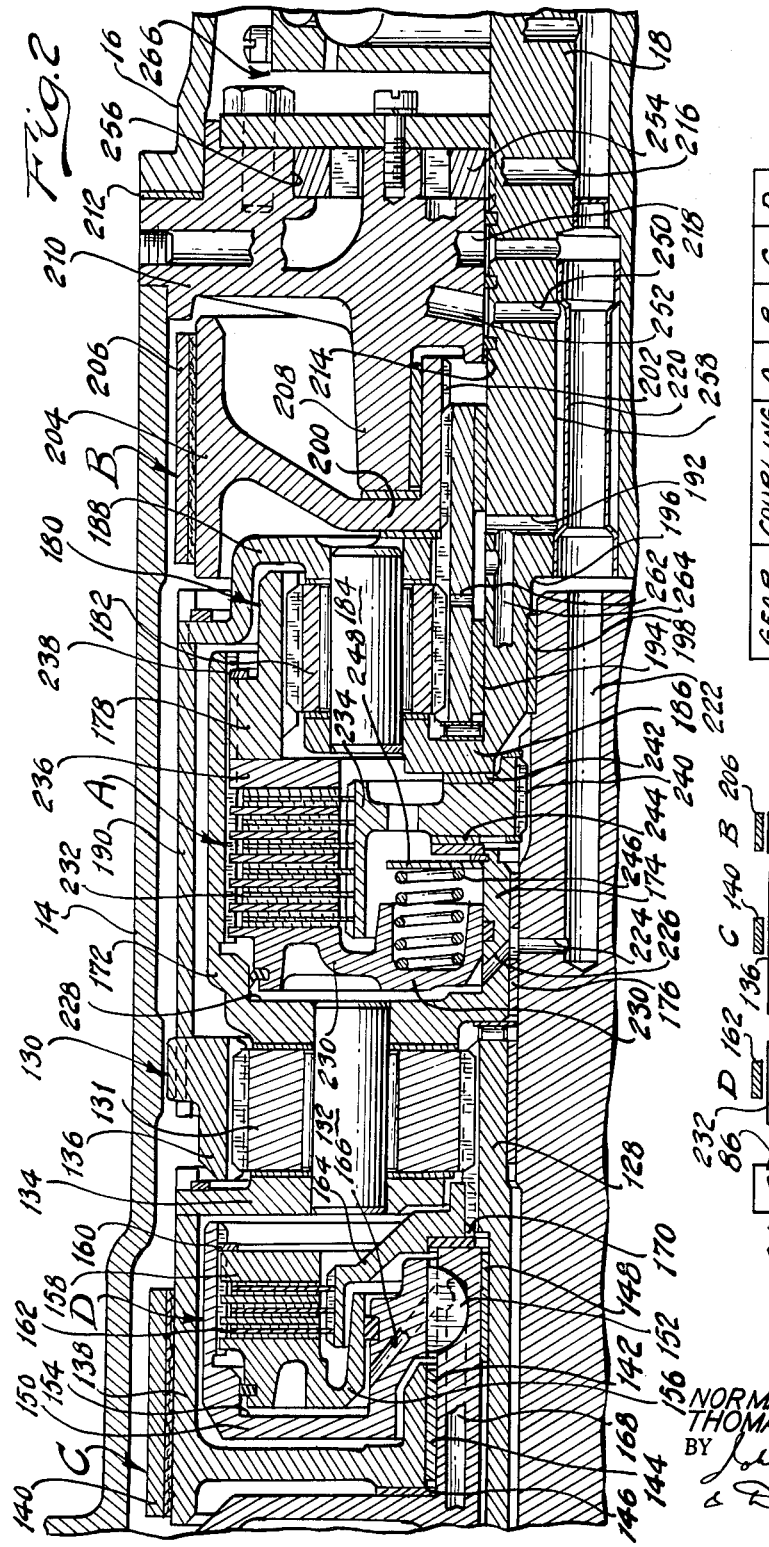
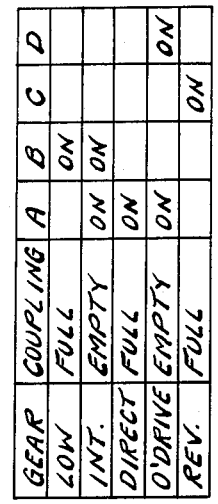
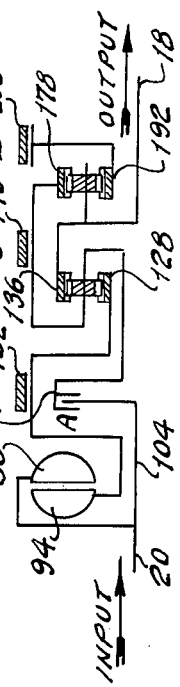
INVENTORS
NORMAN T. GENERAL
THOMAS R. STOCKTON
BY
ATTORNEYS.

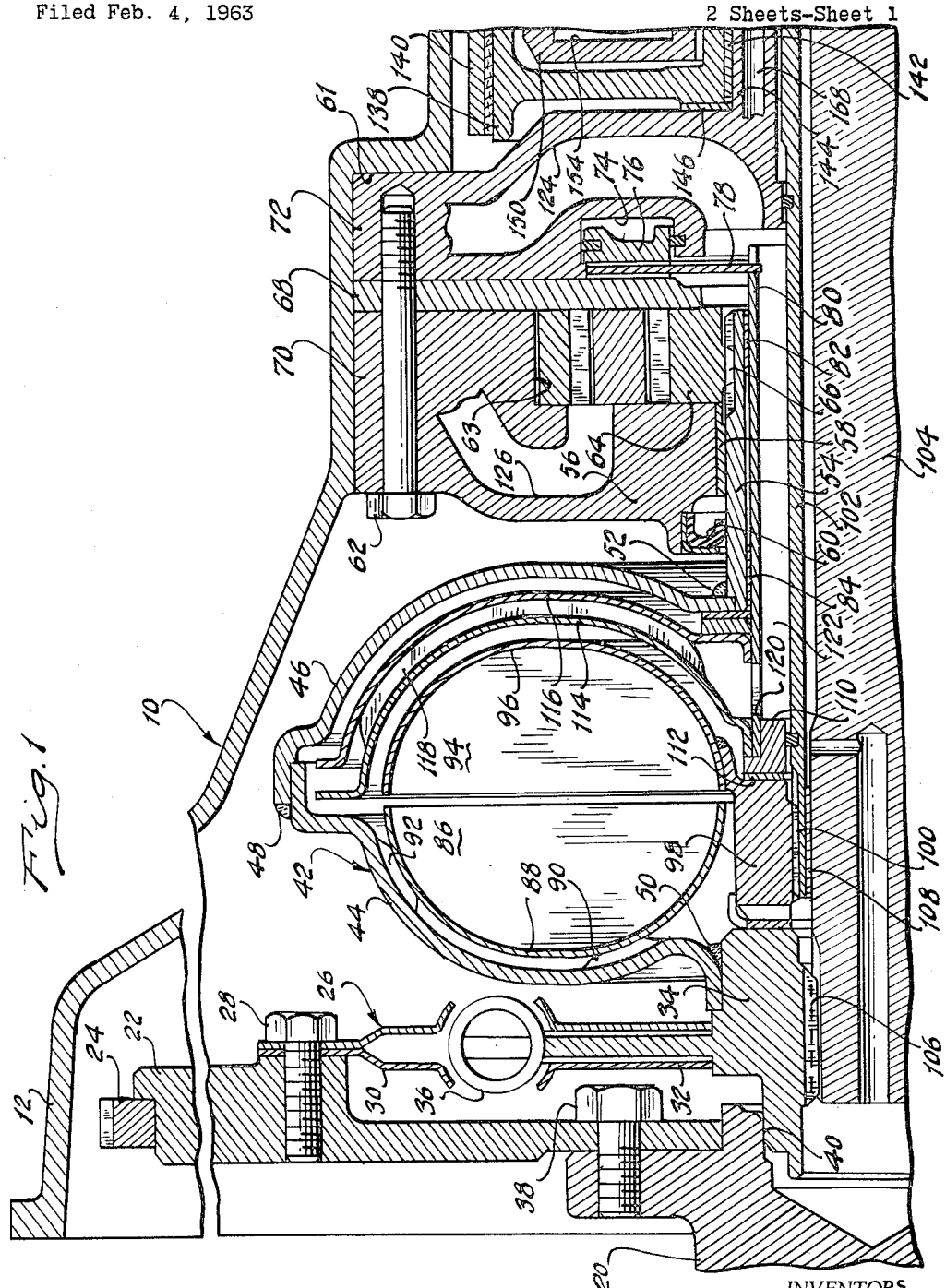

3,237,482
MULTIPLE SPEED RATIO POWER TRANSMISSION MECHANISM
Norman T. General, Orchard Lake, and Thomas R. Stockton, Northville, Mich., assignors to Ford Motor Company, Dearborn, Mich., a corporation of Delaware
Filed Feb. 4, 1963, Ser. No. 255,942
3 Claims. (Cl. 74—688)

Our invention relates generally to power transmission mechanisms, and more particularly to multiple speed ratio power transmission mechanisms that are capable of being used in automotive vehicle drivelines.

According to a principal feature of our invention, we have provided a pair of cooperating planetary gear units having elements that are arranged strategically to provide a plurality of evenly stepped, forward drive speed ratios and a reverse drive speed ratio. Plural couplings in the form of clutches and brakes are employed for controlling the relative motion of the individual elements of the gear units thereby establishing a speed ratio shift sequence that conditions the driveline for any operating road load requirement.

In a preferred form of our invention we have provided a friction clutch and a fluid coupling that function in cooperation with three brakes to provide two forward drive reduction speed ratios, a forward direct-drive ratio and a forward overdrive ratio as well as a reverse drive reduction speed ratio. Provision is made in this embodiment for alternately emptying and filling the toroidal fluid flow cavity of the coupling during a shift sequence to interrupt and establish a torque delivery path from a coupling impeller to the coupling turbine. This sequential operation of the coupling takes place in timed relationship with respect to the application and release of the clutch and the three brakes in a predetermined engagement and release pattern.

The provision of an improved power transmission mechanism of the type above set forth being a principal object of our invention, it is a further object of our invention to provide a multiple speed ratio power transmission mechanism that employs a fluid coupling for establishing a driving connection between a power input element of the gear unit and the driving member, and wherein provision is made for emptying and filling the coupling during a shift sequence to interrupt and establish respectively the torque delivery path between the driving member and the power input element.

It is a further object of our invention to provide a multiple speed ratio power transmission mechanism that employs clutches and brakes capable of controlling the relative motion of the elements of the gear units to establish plural speed ratios and wherein the speed ratio shifts from one ratio to another are characterized by a high degree of smoothness.

It is a further object of our invention to provide such a multiple speed ratio power transmission mechanism which is characterized also by its simplicity in construction, and wherein the shifts from one ratio to another can be accomplished without the need for sequencing the application and release of clutches and brakes in synchronism.

It is a further object of our invention to provide a multiple speed ratio power transmission mechanism having a plurality of forward driving speed ratios and a reverse ratio, and which is characterized by a minimum amount of space for any given torque transmitting capacity.

It is a further object of our invention to provide a multiple speed ratio power transmission mechanism of the type above set forth wherein the fluid coupling forms a portion of a hydrokinetic torque delivery path between a driving member and a power input element of the gear unit, the remaining portion of the input torque being delivered mechanically to another input element of the gear unit during operation in selected speed ratios.

Further objects and features of our invention will become apparent from the following description and from the accompanying drawings, wherein:

FIGURE 1 shows in cross sectional form a portion of a power transmission mechanism employing the features of our invention;

FIGURE 2 shows in cross sectional form another portion of the mechanism shown in part in FIGURE 1;

FIGURE 3 is a schematic representation of the structure of FIGURES 1 and 2; and, FIGURE 4 is a chart showing the clutch and brake engagement and release pattern for the various speed ratios that may be obtained with the structure of FIGURES 1 and 2.

Referring first to FIGURES 1 and 2, a transmission housing is indicated generally by reference character 10. It includes a forward bell housing portion 12 and a rearward gear unit enclosing portion 14. The portion 12 is adapted to be bolted or otherwise secured to an engine block for a vehicle engine in an automotive vehicle driveline. Situated at the rearward portion of the mechanism is a tailshaft extension housing 16 that may be bolted or otherwise secured to the end of the housing portion 14. Extension housing portion 16 encloses a driven shaft or tailshaft 18 that may be connected in a conventional fashion to the vehicle traction wheels through a drive shaft, a differential and axle assembly and a universal joint.

The power input shaft is shown at 20. This may be in the form of an engine driven crankshaft for the internal combustion vehicle engine. An engine driven flywheel is shown at 22. Mounted about the periphery of the flywheel 22 is a starter ring gear 24 which may be engaged by an electric strater motor drive pinion for the purpose of starting the vehicle engine.

A drive plate is indicated generally by reference character 26. It is bolted by bolts 28 at its periphery to the flywheel 22. Plate 26 includes an annular bipartite portion 30. A spring damper arm 32 carried by a drive hub 34 extends through the two parts of the portion 30 in a radial direction. The radially outward portion of the arm 32 is apertured to receive damper springs 36. These springs 36 are seated against spring seat shoulders formed by the spaced parts of the portion 30. A plurality of arms 32 and cooperating damper springs 36 can be provided although only one has been indicated in FIGURE 1. This drive plate 26 is similar in construction to those used with conventional friction disc neutral clutches for contemporary manually controlled transmissions in automotive vehicle drivelines.

The flywheel 22 is bolted to a cooperating flange on the shaft 20 by means of bolts 38. Shaft 20 is provided also with a pilot bore 40 within which extends a portion of the hub 34.

An impeller shell for a fluid coupling is housed within the bell housing portion 12, and it forms a part of a fluid coupling indicated generally by reference character 42. The impeller shell is formed in two parts that are identified separately by reference characters 44 and 46. These shell parts are annular in form and are welded or otherwise secured at their peripheries to form a unitary assembly. By preference, one peripheral portion is telescopically received over the other, and the cooperating margins are welded as shown at 48.

The hub of impeller shell part 44 is secured to the hub 34 by weld metal 50. The hub of shell part 46 is secured by weld metal 52 to an impeller sleeve shaft 54 which is journaled within an opening in a pump housing 56. A bushing 58 is provided for this purpose. A fluid seal 60 is provided between the pump housing 56 and the shaft 54.

The housing 56 is bolted against a shoulder 61 situated between the housing portions 12 and 14. Bolts 62 are provided for this purpose. Housing 56 includes a pump chamber 63 within which are situated pump elements shown in part at 64. A splined connection is provided as shown at 66 between the shaft 54 and the pump elements 64 so that the pump is driven whenever the vehicle engine is operating.

A reaction plate 68 is situated between separate portions 70 and 72 of the housing 56. Portion 72 defines an annular cylinder 74 within which is positioned a brake servo piston 76. Cylinder 74 and piston 76 define a fluid pressure chamber that may be pressurized selectively by a control valve system, not shown.

Situated between the piston 76 and reaction plate 58 is a clutch disc 78 which is splined or otherwise secured drivably to a sleeve shaft 80 rotatably journaled within shaft 54 by bushings 82 and 84.

The impeller shell 42 has secured therein a plurality of impeller blades 86 that are held in place by a stamped sheet metal shroud 88 which in turn can be fixed at 90 and 92 to the interior of the shell part 44. Blades 86 are situated in juxtaposed fluid flow relationship with respect to turbine blades 94 which are carried by a stamped sheet metal shroud 96. Shroud 96 in turn is welded or otherwise drivably connected to a turbine hub 98. This hub is internally splined to receive an externally splined portion 100 of a tubrine sleeve shaft 102 which extends axially in concentric relationship with respect to sleeve shaft 80. A central torque delivery shaft 104 is splined at 106 to an internally splined opening in the hub 34 which in turn is connected, as previously explained, to the power input shaft 20 through the drive plate 26. A bushing 108 is provided between sleeve shaft 102 and shaft 104.

The left-hand end of sleeve shaft 80 as viewed in FIGURE 1, is connected to a hub portion 110 which is separated from hub 98 by a thrust washer 112. Hub 110 and the cooperating end of sleeve shaft 80 carry also a pair of coupling fluid flow distributor shells 114 and 116. These shells 114 and 116 are formed in a shape similar to the shape of shroud 96 and shell part 46. They are situated within the annular cavity formed between shroud 96 and the interior of impeller shell part 46. Shells 114 and 116 are separated axially, the distance between them being uniform throughout their radial extent. The annular space between the shells is formed with a plurality of vanes 118. The outer periphery of the shells 114 and 116 also are spaced axially to define a radial opening. This opening establishes communication between the bladed region between shells 114 and 116 and the interior of the fluid coupling cavity within which the impeller and turbine blades 86 and 94 are situated.

The radially inward region of the space between the shells 114 and 116 communicates through opening 120 with annular passage 122 defined by the sleeve shafts 80 and 102. This annular passage communicates with a passage 124 formed in the housing part 72, the latter forming a fluid storage reservoir in its interior. This reservoir may be defined also in part by housing part 70. A pressure passage for the pump shown in part at 62 and 64 also may be defined by the housing part 70. This passage is identified by reference character 126.

The right-hand end of sleeve shaft 102 is connected to a first sun gear 128 of a forward planetary gear unit identified generally by reference character 130. The sun gear meshes with a plurality of planet pinions 131 which are journaled upon a pinion shaft 132 carried by a carrier member 134. Gear unit 130 includes also a ring gear 136 that meshes with pinions 131.

Carrier 134 is keyed or otherwise drivably connected to a brake drum 138. A circular brake band 140 encircles the drum 138. The band 140 may be tightened in the normal fashion against the drum 138 by a suitable fluid pressure actuated brake servo.

The drum 138 is journaled by means of a bushing 142 upon an extension 144 of the housing part 72. This extension is in the form of a stationary sleeve shaft. A thrust washer 146 accommodates axial thrust loads acting upon the drum 138.

Thus, the carrier 134 may be anchored selectively by engaging and releasing brake band 140. A bushing 148 provides added support for the sleeve shaft 102.

A brake member in the form of an annnular cylinder 150 is situated within drum 138. The inner hub of cylinder 150 is caried by extension 144 and is keyed thereto by a key 152. Thus, the drum 150 is held fast upon extension 144.

Drum 150 defines an annular cylinder 154 within which is received slidably an annular piston 156. A reaction disc 158 is splined to an internally splined outer periphery of the drum 150 and is held axially fast by a snap ring 160. The internally splined portion of drum 150 also carries externally splined discs of a multiple disc brake assembly 162. Cooperating internally splined discs of the assembly 162 are carried by a brake member 164 which is externally splined as indicated. The externally splined discs and the internally splined discs of the assembly 162 are disposed in interdigital relationship in a conventional fashion. They may be urged into braking engagement by the piston 156 upon application of fluid pressure to the cylinder 154 behind the piston 156. Fluid pressure is admitted to this space through a pressure passage 166 which communicates with a fluid pressure passage 168 formed in the extension 144. Passage 168 in turn may communicate with and form a part of an automatic control valve system that controls the distribution of pressure to the cylinder 154.

Brake member 164 is connected positively to sun gear 128 by means of a splined connection 170.

Carrier 134 and pinion shafts 132 are connected drivably to a clutch drum 172, which in turn is formed with a hub 174 journaled upon the shaft 104. Bushings 176 are provided for this purpose. The periphery of clutch drum 172 is connected drivably by means of a splined connection to a ring gear 178 of a second planetary gear unit identified generally by reference character 180. Gear unit 180 includes also planet pinions 182 which mesh with ring gear 178. Each pinion 182 is carried by and journaled upon a pinion shaft 184, which in turn forms a part of a planetary gear carrier member 186. This carrier includes a portion 188 keyed or otherwise positively connected to a torque transfer drum or shell 190 which is connected at its left end, as viewed in FIGURE 1, to the previously mentioned ring gear 136.

Pinions 182 drivably engage a sun gear 192 which is journaled upon an inwardly extending portion of the driven shaft 18. This driven shaft is connected to or is formed integrally with carrier 186. Bushings 194 are provided for the purpose of supporting rotatably the sun gear 192.

The inwardly extending end of driven shaft 18 is formed with a pilot bearing opening 196 which receives the right-hand end of shaft 104. The shafts are journaled relative to each other by a bushing 198.

Sun gear 192 is connected to a brake member 200 by means of a splined connection shown at 202. The periphery of brake member 200 defines a brake drum 204 about which a brake band 206 is situated. Brake band 206 can be applied and released selectively by means of a conventional brake operating servo, not shown, thereby anchoring the member 200 and the sun gear 192 selectively.

Member 200 is formed with an extension that is received within a stationary extension 208 formed on an end wall 210 of the housing. This wall is secured at its periphery to the end of housing portion 14 and provides a shoulder 212 to which the end of extension housing 16 can be bolted.

Shaft 18 is rotatably received within a central bore 214 formed in the wall 210. A radial passage 216 is formed in shaft 18 and communicates with an annular groove that in turn communicates with a pressure distributor passage 218 formed in the wall 210. Passage 216 communicates with a central passage formed in a tubular insert 220 situated within a central opening in the shaft 18. This insert 220 provides a communication between radial passage 216 and a central passage 222 formed in the right-hand end of shaft 104. A radial passage 224 formed in shaft 104 communicates with a pressure supply passage 226 formed in the hub 174 of the clutch drum 172. This passage 226 in turn communicates with a pressure cavity that is defined in part by an annular cylinder 228 formed in the clutch drum 172. An annular piston 230 is received slidably within cylinder 228 and it is adapted to move axially as pressure is introduced to the cylinder through passage 226.

Situated adjacent piston 230 is a plurality of clutch discs in the form of a multiple disc clutch assembly 232. Alternate ones of the discs of assembly 232 are externally splined and are carried by internal splines on the periphery of drum 172. Internally splined discs of assembly 232 are carried by an externally splined clutch member 234. A reaction disc 236 is provided also and is situated in abutting relationship with respect to ring gear 178, the latter in turn being held axially fast with respect to the clutch durm 172 by a snap ring 238.

As pressure is admitted to the annular cylinder 228, the discs of the assembly 232 establish a driving connection between member 234 and ring gear 178. Member 234 in turn is splined at 240 to an externally splined portion of shaft 104. Thrust washers 242 and 244 are situated on either side of the member 234 in engagement respectively with carrier 186 and a reaction snap ring carried by hub 174 of the drum 172.

Clutch piston return springs 246 are situated between a spring seat member 248 and the piston 230 for the purpose of normally urging the piston 230 to a clutch release position.

A lubricating fluid pressure passage 250 also is formed in shaft 18 and is situated in communication with an annular groove that in turn is supplied with lubricating pressure by a lube pressure passage 252 formed in the wall 210. The passages 218 and 252 can communicate with a control valve system of which a positive displacement pump shown in part at 254 is a part. This pump 254 is received within a pump cavity 256 formed in the wall 210. The driving rotor for the pump 254 is drivably connected to shaft 18.

The lubricating fluid made available to passage 250 is transferred through shaft 18 by means of the annular space formed about the insert 220. This space is identified by reference character 258.

A lube pressure passage 260 transfers lube pressure from the space 258 to a lube passage 262 formed in the sun gear 192 thus lubricating the gear unit 180. Lube pressure is distributed also from passage 260 through a branch passage 264 that in turn distributes lube oil to the region of the multiple disc clutch assembly 232.

A governor pressure valve mechanism is identified generally by reference character 266. This also may form a part of an automatic control valve circuit, not shown, that controls distribution of pressure to the disc assemblies and the friction brakes during shift sequences.

It is necessary during operation of the mechanism to empty and fill the fluid coupling. This is done by means of the fluid distributor shells 114 and 116, hereinafter referred to for purposes of simplicity by the term "scoop shell." The coupling may be filled initially by introducing fluid into the annular pasageway 122. The reservoir defined by the housing parts 72 and 70 maintains a supply of fluid that may be used for supplying the passageway 122. If it is assumed that the brake shown at 76 and 78 is released, the scoop shell will rotate in unison with the impeller shell parts 44 and 46.

A centrifugal pressure then will be developed in the vaned passageways of the scoop shell, and this pressure will be equal to the centrifugal pressure developed in the toroidal fluid flow cavity of the coupling itself. One pressure will tend to balance the other, and therefore the fluid will be contained within the cavity normally during operation. If it is desired to empty the coupling, however, it merely is necessary to engage the brake 76 and 78 thereby anchoring the scoop shell. The centrifugal pressure in the vaned passage of the scoop shell then will become zero. This will cause fluid to flow under pressure from the cavity of the coupling in a radially inward direction through the vaned pasages of the scoop shell. It then is transferred through passageway 122 into the fluid reservoir.

If it then is desired to refill the coupling, it merely is necessary to release again the brake 76 and 78. Pressure from the pump shown in part at 62 and 64 may be distributed to passage 124 by the aforementioned control system. The vaned scoop shell under these circumstances will begin to rotate and will function as a centrifugal pump which will evacuate the reservoir and return the fluid in the reservoir to the interior of the coupling cavity thus conditioning the coupling for torque delivery.

During operation of the transmission mechanism, the clutch and the brakes are applied in sequence. For the purpose of describing this operation, the brake band 140 will be identified by reference letter C, the brake band 206 will be identified by reference letter B, the multiple disc brake assembly will be identified by reference letter D and the multiple disc clutch assembly 232 will be identified by reference letter A. The sequence of the operation of the fluid coupling and the brakes and the clutch A will be best understood by referring to FIGURE 4.

To establish the lowest speed ratio operation, the fluid coupling is filled in the manner previously described. Brake B is anchored thereby conditioning the sun gear 192 for operation as a reaction element. The engine torque then is distributed from the impeller to the turbine of the fluid coupling. The turbine torque then is transferred directly to sun gear 128. This imparts a negative torque to the ring gear 136 which in turn is transferred to the output shaft. A positive torque reaction, however, is exerted upon carrier 134 which is transferred directly to ring gear 178. This ring gear torque is in a positive direction, and since it is greater in magnitude than the ring gear torque of gear unit 130, the resultant output torque delivered to the shaft 18 is in a positive direction. The over-all multiplication ratio in one particular operating embodiment of my invention is 3:1.

To establish intermediate speed ratio operation, brake B continues to function as a reaction member for the sun gear 192. The fluid coupling is emptied by braking the disc brake 76 and 78 and clutch A is applied. Engine torque then bypasses the fluid coupling and is distributed directly through the clutch A to the carrier 134 and hence directly to the ring gear 178. The gear unit 180 therefore functions as the sole torque multiplication means. The output torque then made available to the power output shaft 18 is equal to the carrier torque applied to carrier 186. In a preferred embodiment of my invention, the intermediate torque ratio thus obtained is 1.50:1.

Direct drive or third speed operation can be obtained by refilling the fluid coupling and releasing the brake band B. This locks the planetary gear units together for rotation in unison thereby establishing a split torque delivery path between the power input driving shaft 20 and the shaft 18, a portion of the input torque being transferred through clutch A and the balance of the torque being transferred hydrodynamically through the fluid coupling.

A fourth speed ratio or overdrive ratio is obtained by applying brake D and by emptying the fluid coupling. Under these circumstances, a direct drive connection is established again between the driving shaft 20 and the carrier 134. Since the brake D anchors sun gear 128, the ring gear 136 is overdriven, and this overdriving motion is distributed directly to the power output shaft 18. The gear unit 180 performs no function during overdrive operation. The overdrive torque ratio established in one embodiment of my invention is .75:1.

The sequential emptying and filling of the fluid coupling makes possible a gradual transition in the torque delivery path between the elements of the gear units thereby cushioning ratio shifts to provide a maximum degree of smoothness during the acceleration period of the vehicle.

Reverse drive operation can be established by filling the fluid coupling and by applying brake C. Brake C anchors carrier 134 so that it will functinon as a reaction member. Turbine torque then is distributed to the sun gear 128 which causes ring gear 136 and the driven shaft 18 to rotate in a reverse direction. In a preferred embodiment, the reverse driving ratio is 3:1.

Having described a preferred embodiment of our invention, what we claim and desire to secure by United States Letters Patent is:

1. A power transmission mechanism comprising a pair of planetary gear units, each gear unit having a ring gear, a sun gear, a carrier and planet pinions rotatably supportably supported by said carrier in meshing engagement with said sun and ring gears, a driving member, a driven member, clutch means for connecting selectively said driving member to the carrier of the first of said units during operation in the second, third and fourth forward driving speed ratio, a hydrokinetic unit having an impeller and a turbine disposed in toroidal fluid flow relationship, said impeller being connected to said driving member, said turbine member being connected to the sun gear of said first unit, means for emptying and filling selectively said hydrokinetic unit to disable respectively said hydrokinetic unit and condition the same for torque delivery, said hydrokinetic unit being filled during operation in first and third forward driving speed ratios and during operation in a reverse driving speed ratio, first brake means for anchoring and releasing selectively said sun gear of said first unit, said sun gear of said first unit being anchored during fourth speed ratio operation, second brake means for anchoring the carrier of said unit during operation in the reverse speed ratio, the ring gear of the second unit being connected to the carrier of the first unit, third brake means for anchoring selectively the sun gear of said first unit during operation in fourth speed ratio, the ring gear of said first unit and the carrier of said second unit being connected to said driven member, the means for emptying and filling said hydrokinetic unit comprising a scoop member journaled for rotation about the axis of said hydrokinetic unit and including a radial flow passage extending to an outward region of said hydrokinetic unit and communicating with the interior thereof, said emptying and filling means comprising a sleeve shaft carrying said scoop member, said sleeve shaft being rotatably journaled within a stationary portion of said mechanism and defining in part a fluid flow path that communicates with the torus circuit of said hydrokinetic unit, and brake means for anchoring selectively said sleeve shaft against a stationary portion of said mechanism.

2. In a power transmission mechanism, a multiple speed ratio gear mechanism comprising gear elements capable of establishing plural torque delivery paths between the driving member and the driven member, a blade hydrokinetic unit having an impeller member and a turbine member disposed in toroidal fluid flow relationship, said impeller member being connected to said driving member, said turbine member being connected to a power input gear element of said gear mechanism, said hydrokinetic unit comprising a scoop member extending from a radially inward portion thereof to a radially outward portion thereof, said scoop member defining a radial flow fluid distributor passage communicating with the interior of said hydrokinetic unit, means for journaling said scoop member for rotation about the geometric axis of said hydrokinetic unit, at least one friction torque establishing means for controlling the rate of motion of one gear element relative to another in sequence with the engagement and release of said brake means whereby a speed ratio change can be accomplished, the means for journaling said scoop member comprising a sleeve shaft carrying said scoop member, said sleeve shaft being rotatably journaled within a stationary portion of said mechanism and defining in part a fluid flow path that communicates with the torus circuit of said hydrokinetic unit, and brake means for anchoring selectively said sleeve shaft against a stationary portion of said mechanism.

3. In a multiple speed ratio gear mechanism comprising gear elements capable of establishing plural torque delivery paths between a driving member and a driven member, a bladed hydrokinetic unit having an impeller member and a turbine member disposed in toroidal fluid flow relationship, said impeller member being connected to said driving member, said turbine member being connected to a first power input element of said gear mechanism, said hydrokinetic unit comprising a scoop member extending from a radially inward portion thereof to a radially outward portion thereof, said scoop member defining a radial flow fluid distributor passage communicating with the interior of said hydrokinetic unit, means for journaling said scoop member for rotation about the geometric axis of said hydrokinetic unit, selectively engageable brake means for anchoring said scoop member, at least one friction torque establishing means for controlling the rate of motion of one gear element relative to another in sequence with the engagement and release of said brake means whereby a speed ratio change can be accomplished, said friction torque establishing means comprising a selectively engageable clutch adapted to establish and interrupt a torque delivery path between said driving member and a second power input element of said mechanism, a selectively engageable brake adapted to anchor selectively said second element, a second brake adapted to anchor said first element when the selectively engageable brake means for said scoop member is applied, another brake adapted to anchor selectively a third element of said mechanism, the means for journaling said scoop member comprising a sleeve shaft carrying said scoop member, said sleeve shaft being rotatably journaled within a stationary portion of said mechanism and defining in part a fluid flow path that communicates with the torus circuit of said hydrokinetic unit, said brake means being adapted to anchor selectively said sleeve shaft against a stationary portion of said mechanism, a fourth element of said mechanism being connected to said driven member.

References Cited by the Examiner

UNITED STATES PATENTS

| | | | |
|---|---|---|---|
| 2,352,004 | 6/1944 | Pollard | 74—677 |
| 2,627,166 | 2/1953 | Becker | 60—54 |
| 2,664,706 | 1/1954 | Becker | 60—54 |
| 2,736,407 | 2/1956 | Smirl | 74—688 |
| 2,786,369 | 3/1957 | Simpson | 74—759 |
| 2,897,689 | 8/1959 | Waclawek | 74—688 |
| 2,930,258 | 3/1960 | Flinn | 74—688 |

DAVID J. WILLIAMOWSKY, *Primary Examiner.*

DON A. WAITE, *Examiner.*

T. C. PERRY, *Assistant Examiner.*